United States Patent
Egoshi

(10) Patent No.: US 8,050,810 B2
(45) Date of Patent: Nov. 1, 2011

(54) METHOD OF CONTROLLING HYBRID VEHICLE

(75) Inventor: Teruyoshi Egoshi, Inzai (JP)

(73) Assignees: Hyundai Motor Company, Seoul (KR); Hyundai Motor Japan R&D Center Inc., Inzai, Chiba (JP); Kia Motors Corporation, Seoul (KR)

( * ) Notice: Subject to any disclaimer, the term of this patent is extended or adjusted under 35 U.S.C. 154(b) by 1001 days.

(21) Appl. No.: 11/949,476

(22) Filed: Dec. 3, 2007

(65) Prior Publication Data

US 2008/0189002 A1     Aug. 7, 2008

(30) Foreign Application Priority Data

Feb. 6, 2007     (KR) .................. 10-2007-0012034

(51) Int. Cl.
*G05D 3/00*     (2006.01)

(52) U.S. Cl. ...... 701/22; 180/65.1; 180/65.21; 318/139; 318/141; 307/9.1; 307/10.1; 307/10.6

(58) Field of Classification Search .................. 701/22; 180/65.1, 65.21; 318/139, 141; 307/9.1, 307/10.1, 10.6

See application file for complete search history.

(56) References Cited

U.S. PATENT DOCUMENTS

| | | | |
|---|---|---|---|
| 6,949,897 B2 * | 9/2005 | Wakashiro et al. | 318/139 |
| 7,715,958 B2 * | 5/2010 | Kumar | 701/22 |
| 7,941,259 B2 * | 5/2011 | Tabata et al. | 701/54 |

FOREIGN PATENT DOCUMENTS

| | | |
|---|---|---|
| JP | 9098516 | 4/1997 |
| JP | 2000-156916 | 6/2000 |
| KR | 1020030018878 | 3/2003 |
| KR | 1020040036525 | 4/2004 |

* cited by examiner

*Primary Examiner* — Mark Hellner
*Assistant Examiner* — Redhwan k Mawari
(74) *Attorney, Agent, or Firm* — Morgan, Lewis & Bockius LLP

(57) ABSTRACT

A method of controlling a hybrid vehicle with an engine, a battery, and at least one motor generator. System efficiencies of each of several candidate driving states are calculated. Calculating efficiency when the battery is discharged uses power of the engine $P_{fuel}$, power drawn from the battery $P_{b,out}$, and required driving power $P_{demand}$. Calculating efficiency when the battery is charged uses $P_{fuel}$, $P_{demand}$, and power charged to the battery $P_{b,in}$. $P_{b,out}$ is calculated using a real battery discharge power $P_{b,out,real}$, a battery discharge energy efficiency $\eta_{bd}$, a historic efficiency $\eta_{b,pwr}$ of energy loss when the battery is charged, and a correction coefficient $SOC_{correction}$ for controlling the battery charge amount. $P_{b,in}$ is calculated using real battery charge power $P_{b,in,real}$, battery charge energy efficiency $\eta_{bc}$, $\eta_{bd}$, and efficiency $\eta_{in,pwr}$ when power is consumed in the future. The driving state with the highest efficiency is then selected.

6 Claims, 3 Drawing Sheets

--PRIOR ART--

METHOD OF CONTROLLING HYBRID VEHICLE

CROSS-REFERENCE TO RELATED APPLICATIONS

The present application is based on, and claims priority from, Korean Application Serial Number 10-2007-0012034, filed on Feb. 6, 2007, the disclosure of which is hereby incorporated by reference herein in its entirety.

FIELD OF THE INVENTION

The present invention relates to a method of controlling a hybrid vehicle.

BACKGROUND OF THE INVENTION

Hybrid vehicles generally use motor generators at slow engine speeds, at which the motor generators have better torque characteristics than internal combustion engines, and use internal combustion engines at moderate to fast speeds, at which the engines have better torque characteristics. This improves fuel efficiency, as the engine is not used when the vehicle travels at slow speeds.

To control a hybrid vehicle, two system efficiencies are calculated, and the vehicle is controlled with the higher of the calculated system efficiencies. The system efficiencies are calculated by Equations 1.

$$\eta_{sys,dchg} = \frac{P_{demand}}{P_{fuel} + P_{b,out,real}/\eta_{bd}}$$

$$\eta_{sys,chg} = \frac{P_{demand} + (P_{b,in,real})(\eta_{bc})(\eta_{bd})}{P_{fuel}}$$

Equations 1 where:

$\eta_{sys,dchg}$ denotes system efficiency of a driving state of discharging the battery, $\eta_{sys,chg}$ denotes system efficiency of a driving state of charging the battery, $\eta_{bd}$ denotes discharge efficiency of the battery, $\eta_{bc}$ denotes charge efficiency of the battery, $P_{demand}$ denotes a required driving power, $P_{fuel}$ denotes power of the internal combustion engine, $P_{b,out,real}$ denotes real discharge power of the battery, and $P_{b,in,real}$ denotes real charge power of the battery.

FIG. 2 illustrates a simulation result of a test performed on a hybrid vehicle on the basis of the system efficiency calculated according to the above-described method. The initial state of charge (SOC) of the battery is 60%. After the simulation ends, the state of charge of the battery is 53.33%. Relative fuel efficiency is set to 1 as a reference.

This method does not consider energy loss that occurs when the battery is charged. Therefore, when the SOC of the battery is used in a range from 50 to 70%, system efficiency of discharge is always calculated as being higher, and discharging the battery 13 is favored, leading to the battery being discharged over time.

SUMMARY OF THE INVENTION

An embodiment of the present invention provides a method of controlling a hybrid vehicle. When the battery is discharged, system efficiency of each of the candidate points of the driving states is calculated using a ratio of how much power $P_{fuel}$ of the engine and power $P_{b,out}$ drawn from the battery are used to generate the required driving force $P_{demand}$. The power $P_{b,out}$ drawn from the battery is calculated by dividing real discharge power $P_{b,out,real}$ of the battery by discharge energy efficiency $\eta_{bd}$ of the battery, history $\eta_{b,pwr}$ of energy loss when the battery is charged, and a coefficient $SOC_{correction}$ for controlling the battery charge amount according to charge capacity of the battery.

According to another embodiment of the present invention, when the battery is charged, system efficiency of each of the candidate points of the driving states is calculated using a ratio of how much power $P_{fuel}$ of the internal combustion engine is used to generate the required driving force $P_{demand}$ and power $P_{b,in}$ charged to the battery. The power $P_{b,in}$ charged to the battery is calculated by multiplying real charge power $P_{b,in,real}$ of the battery by charge energy efficiency $\eta_{bc}$ of the battery, discharge energy efficiency $\eta_{bd}$ of the battery, and efficiency $\eta_{m,pwr}$ when the charged power is consumed in the future.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, preferred embodiments of the present invention will be described with reference to the accompanying drawings.

Figure 1:
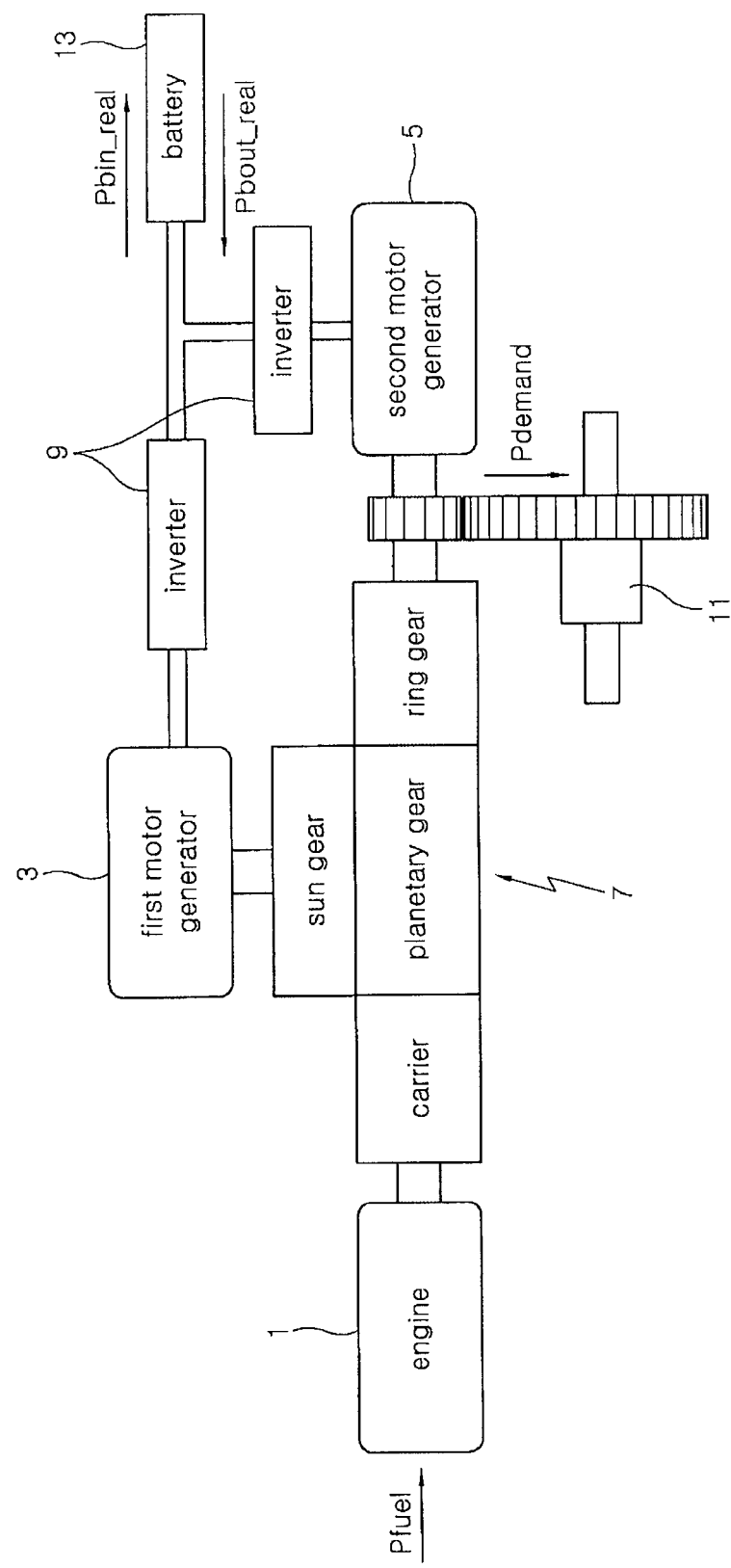
FIG. 1 is a schematic view of an exemplary hybrid vehicle.
Figure 2:
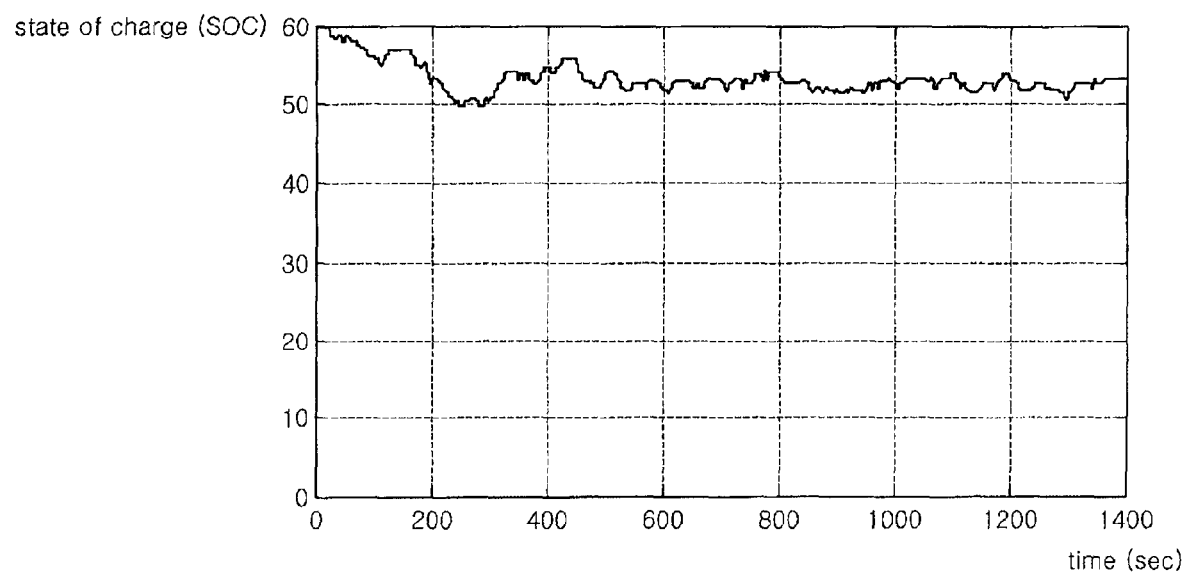
FIG. 2 is a graph illustrating a result of a simulation on a hybrid vehicle on the basis of system efficiency calculated by a traditional method.

Referring to FIG. 1, a hybrid vehicle includes an engine 1, a first motor generator 3, and a second motor generator 5. A planetary gear set 7 is provided such that engine 1 is connected to a carrier, first motor generator 3 is connected to a sun gear, and second motor generator 5 is connected to a ring gear. Since first motor generator 3 and second motor generator 5 are connected to a battery 13 by inverters 9, and the ring gear of planetary gear set 7 is connected to a differential 11, power can be taken off by driving wheels.

In a hybrid system, power of the engine I passes through the planetary gear set 7, drives the first motor generator 3, and allows first motor generator 3 to generate electricity, such that the power is charged to the battery 13. Alternatively, power of engine 1 is larger than the required driving force of the vehicle, and the extra driving force passes through planetary gear set 7, drives a second motor generator 5, and allows second motor generator 5 to generate electricity, such that the power is charged to battery 13.

Therefore, when battery 13 is charged, energy loss of engine 1, first motor generator 3, and second motor generator 5 needs to be considered. System efficiency in consideration of the energy loss when battery 13 is charged is represented by Equations 2.

$$\eta_{sys,dchg} = \frac{P_{demand}}{P_{fuel} + P_{b,out,real}/(\eta_{bd} \cdot \eta_{b,pwr})}$$ Equations 2

$$\eta_{sys,chg} = \frac{P_{demand} + (P_{b,in,real})(\eta_{bc})(\eta_{bd})(\eta_{m,pwr})}{P_{fuel}}$$

where:

$\eta_{sys,dchg}$ denotes system efficiency of a driving state of discharging the battery, $\eta_{sys,chg}$ denotes system efficiency of a driving state of charging the battery, $\eta_{bd}$ denotes discharge efficiency of the battery, $\eta_{bc}$ denotes charge efficiency of the battery, $P_{demand}$ denotes a required driving power, $P_{fuel}$ denotes power of the internal combustion engine, $P_{b,out,real}$ denotes real discharge power of the battery, and $P_{b,in,real}$ denotes real charge power of the battery, $\eta_{b,pwr}$ will be described below with reference to Equation 3, and $\eta_{m,pwr}$ will be described below with reference to Equation 4.

$\eta_{b,pwr}$ denotes history of the energy loss when battery 13 is charged. $\eta_{b,pwr}$ is calculated when a driving state of charging battery 13 is selected, and reflected when efficiency of a driving state of discharging battery 13 is calculated. $\eta_{b,pwr}$ is calculated by Equation 3.

$$\eta_{b,pwr} = \frac{\int \left( |P_{b,in,real}| \cdot \frac{|P_{b,in,real}|}{P_{fuel} - P_{demand}/\eta_c} \right) dt}{\int |P_{b,in,real}| dt}$$ Equation 3 where $\eta_e$ denotes engine efficiency.

$\eta_{m,pwr}$ denotes efficiency when the power charged to battery 13 is consumed in the future. $\eta_{m,pwr}$ is determined according to history of efficiency of the first motor generator 3 and second motor generator 5. $\eta_{m,pwr}$ is calculated by Equation 4.

$$\eta_{m,pwr} = \frac{\int \eta_m dt}{\int 1 dt}$$ Equation 4 where $\eta_m$ denotes motor efficiency.

Figure 3:
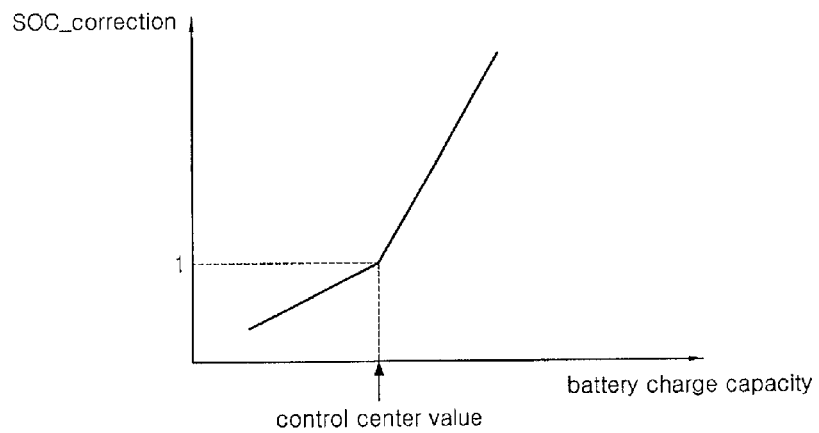
FIG. 3 is a graph illustrating a relationship between battery charge capacity and a correction coefficient.

On the basis of Equation 2, system efficiency is calculated to adjust the amount of charging and discharging of battery 13 on the basis of the charge and discharge capacity of battery 13 by Equations 5.

$$\eta_{sys,dchg} = \frac{P_{demand}}{P_{fuel} + P_{b,out,real}/(\eta_{bd} \cdot \eta_{b,pwr} \cdot SOC_{correction})}$$ Equations 5

$$\eta_{sys,chg} = \frac{P_{demand} + (P_{b,in,real})(\eta_{bc})(\eta_{bd})(\eta_{m,pwr})}{P_{fuel}}$$

where $SOC_{correction}$ denotes a coefficient that varies according to the charge capacity of battery 13, as shown in FIG 3.

Speed returning to a desired control center value increases as much as the charge capacity of battery 13 is distant from the control center value. In this way, battery 13 is used such that high energy efficiency can be obtained and a reduction in the life can be prevented.

Figure 4:
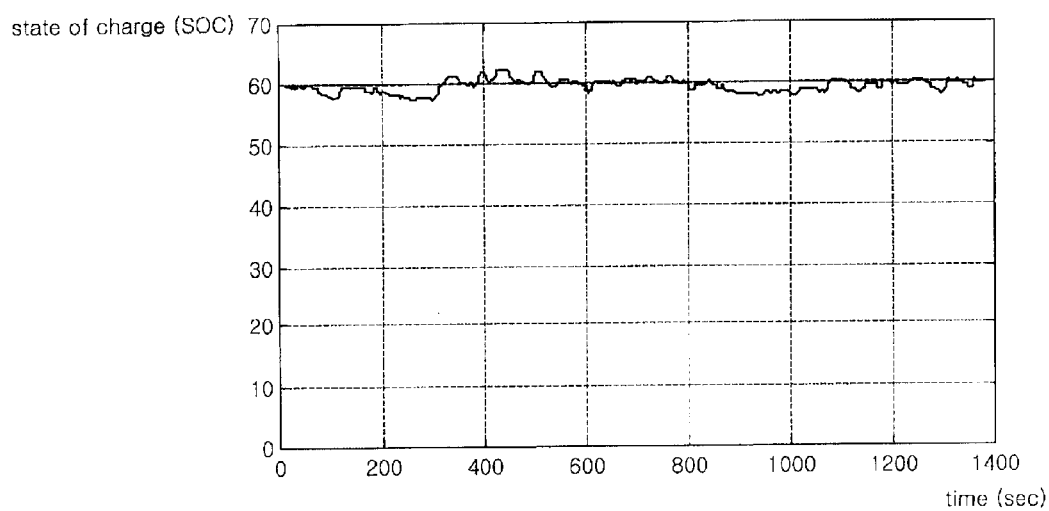
FIG. 4 is a graph illustrating a result of a simulation on a hybrid vehicle on the basis of system efficiency calculated by an exemplary method.

FIG. 4 is a view illustrating a simulation result when an FTP72 mode is performed at an initial SOC=60% according to the method of calculating the system efficiency using Equation 5.

That is, when the highest efficiency is selected from the system efficiencies calculated according to the driving states of the hybrid vehicle, and then the hybrid vehicle is driven, since battery 13 is used in the vicinity of the control center value, it is possible to prevent discharge being favored, and the resulting reduction of the life of battery 13. Even though relative fuel efficiency is 0.93, which is lower than the value calculated by the prior art Equation 1, the difference between the initial SOC and the final SOC of the battery 13 is small. Therefore, considering the difference, better fuel efficiency than that in the prior art is obtained in terms of the entire hybrid system.

As described above, according to embodiments of the present invention, the energy loss that occurs when the battery is charged and a function for adjusting the amount of charging and discharging of the battery according to the charge capacity of the battery are reflected in the method of calculating the system efficiency, such that fuel efficiency is improved, the battery is used with high efficiency, and the life of the battery is extended.

Although the preferred embodiments of the present invention have been disclosed for illustrative purposes, those skilled in the art will appreciate that various modifications, additions and substitutions are possible, without departing from the scope and spirit of the present invention as defined in the accompanying claims.

What is claimed is:

1. A method of controlling a hybrid vehicle, the vehicle comprising an engine, a battery, and at least one motor generator, the method comprising:

calculating system efficiencies of each of a plurality of candidate driving states, where one of the driving states comprises the battery being discharged, where calculating the system efficiency of the discharging battery driving state uses a power of the engine $P_{fuel}$, a power drawn from the battery $P_{b,out}$, and a required driving power $P_{demand}$;

where $P_{b,out}$ is calculated using a real discharge power $P_{b,out,real}$ of the battery, a discharge energy efficiency $\eta_{bd}$ of the battery, a historic efficiency $\eta_{b,pwr}$ of energy loss when the battery is charged, and a correction coefficient $SOC_{correction}$ for controlling the battery charge amount according to charge capacity of the battery; and selecting and implementing the driving state whose system efficiency is highest.

2. The method as set forth in claim 1, wherein the system efficiency $\eta_{sys,dchg}$ of the discharging battery driving state is calculated by:

$$\eta_{sys,dchg} = \frac{P_{demand}}{P_{fuel} + P_{b,out,real}/(\eta_{bd} \cdot \eta_{b,pwr} \cdot SOC_{correction})}.$$

3. The method as set forth in claim 1, wherein $\eta_{b,pwr}$ is calculated by:

$$\eta_{b,pwr} = \frac{\int \left( |P_{b,in,real}| \cdot \frac{|P_{b,in,real}|}{P_{fuel} - P_{demand}/\eta_c} \right) dt}{\int |P_{b,in,real}| dt},$$

where $\eta_e$ denotes an engine efficiency and $P_{b,in,real}$ denotes a real charge power of the battery.

4. A method of controlling a hybrid vehicle, the vehicle comprising an engine, a battery, and at least one motor generator, the method comprising:

calculating system efficiencies of a plurality of candidate driving states, where one of the driving states comprises the battery being charged, where calculating the system efficiency of the charging battery driving state uses a power of the engine $P_{fuel}$, a required driving power $P_{demand}$, and a power charged to the battery $P_{b,in}$;

where $P_{b,in}$ is calculated using a real charge power $P_{b,in,real}$ of the battery, a charge energy efficiency $\eta_{bc}$ of the battery, a discharge energy efficiency $\eta_{bd}$ of the battery, and an efficiency $\eta_{m,pwr}$ when power is consumed in the future; and selecting and implementing the driving state whose system efficiency is highest.

5. The method as set forth in claim 4, wherein the system efficiency $\eta_{sys,chg}$ of the charging battery driving state is calculated by:

$$\eta_{sys,chg} = \frac{P_{demand} + (P_{b,in,real})(\eta_{bc})(\eta_{bd})(\eta_{m,pwr})}{P_{fuel}}.$$

6. The method as set forth in claim 4, wherein $\eta_{m,pwr}$ is calculated by:

$$\eta_{m,pwr} = \frac{\int \eta_m dt}{\int 1 dt},$$

where $\eta_m$ denotes a motor efficiency.

* * * * *